No. 615,157. Patented Nov. 29, 1898.
J. J. GILLINGER.
TRACTION WHEEL.
(Application filed Aug. 3, 1897.)
(No Model.) 2 Sheets—Sheet 1.
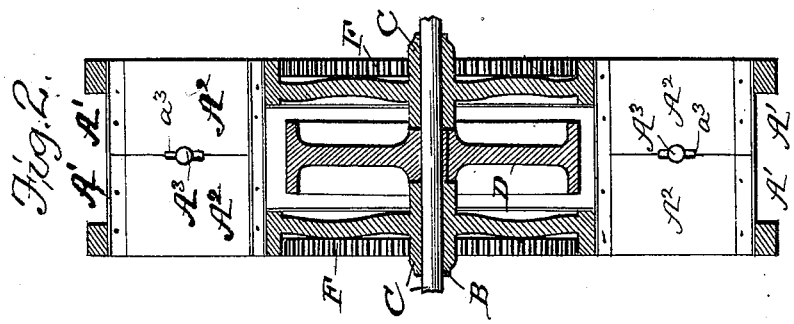
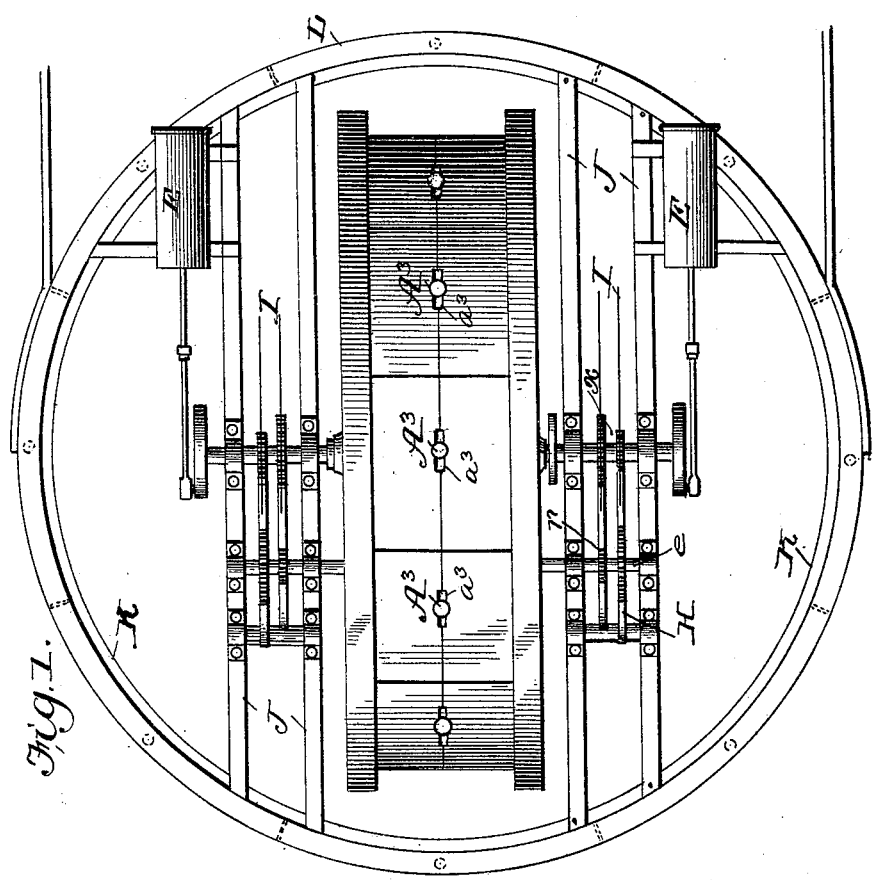
WITNESSES:
Jos. A. Ryan
P. B. Turpin
INVENTOR
Jeremiah J. Gillinger
BY Munn & Co.
ATTORNEYS.

No. 615,157. Patented Nov. 29, 1898.
J. J. GILLINGER.
TRACTION WHEEL.
(Application filed Aug. 3, 1897.)
(No Model.) 2 Sheets—Sheet 2.
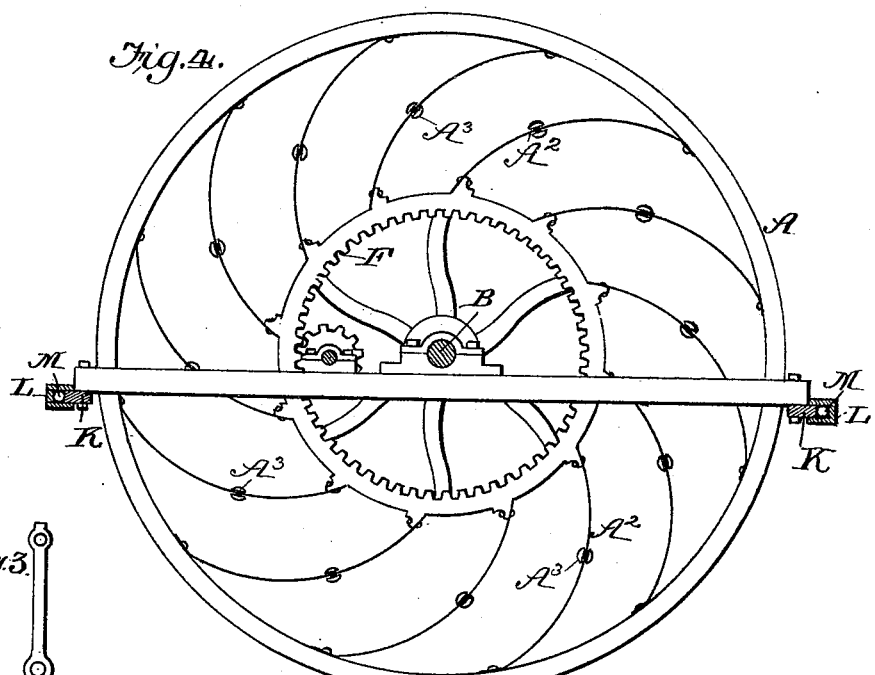
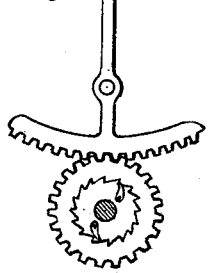
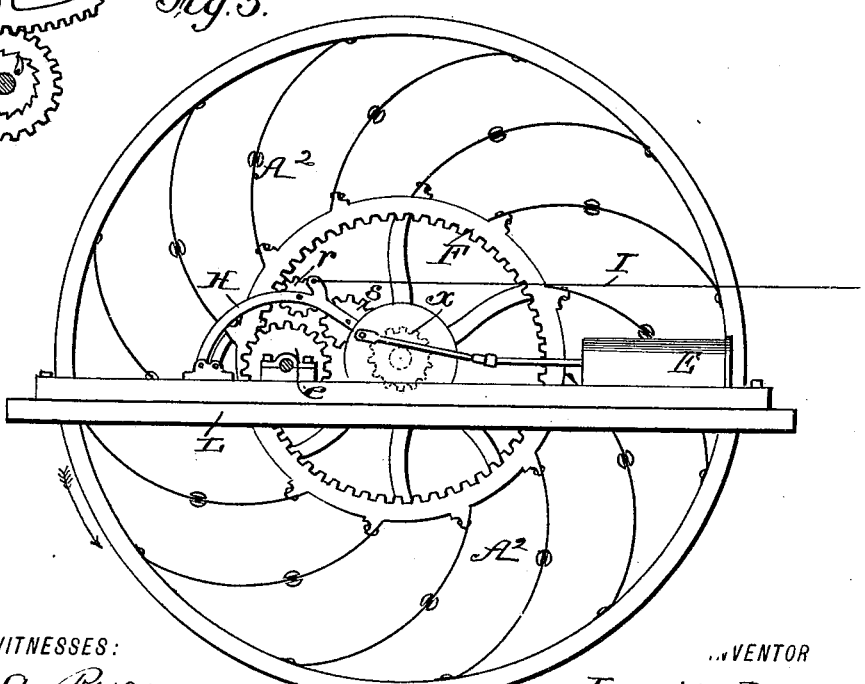
WITNESSES:
Jos. A. Ryan
P. B. Turpin
INVENTOR
Jeremiah J. Gillinger
BY Munn & Co.
ATTORNEYS.

UNITED STATES PATENT OFFICE.

JEREMIAH J. GILLINGER, OF QUITMAN, MISSOURI.

TRACTION-WHEEL.

SPECIFICATION forming part of Letters Patent No. 615,157, dated November 29, 1898.

Application filed August 3, 1897. Serial No. 647,004. (No model.)

*To all whom it may concern:*

Be it known that I, JEREMIAH J. GILLINGER, of Quitman, in the county of Nodaway and State of Missouri, have invented a new and useful Improvement in Traction-Wheels, of which the following is a specification.

My invention is an improvement in traction-wheels; and it consists in certain features of construction and novel combinations of parts, as will be hereinafter described, and pointed out in the claims.

In the drawings, Figure 1 is a top plan view of my wheel. Fig. 2 is a detail cross-section of the wheel proper. Fig. 3 is a detail view of lever mechanism which may be used for starting the wheel. Fig. 4 is a sectional side elevation of the wheel, and Fig. 5 is a side elevation thereof.

The wheel comprises the wheel proper, A, and the shaft B, which is passed freely through and between the opposite hubs C of the wheel A and has between the said hubs the fly-wheel D. The shaft B is in practice driven by suitable mechanism. It may be the engines E and intermediate gearing and shafting, as shown, or other suitable means may be employed to impart motion to the shaft B. The shaft B is geared with the wheel A preferably by a train of gears $e$, $x$, $s$, and $r$ between the said shaft B and gear-wheels or rings F, forming parts of the hubs of the wheel A, as shown.

For starting the wheel or for assisting in such operation I may employ the lever mechanism illustrated in Fig. 3.

The wheel A has a rim preferably formed in side sections A' and curved spring-spokes $A^2$ between the hubs and their respective rim-sections, clips or bolts $A^3$, passing through slots $a^3$, being employed to hold the springs $A^2$ together. The gear-train between the shaft B and wheel A includes a wheel $s$, carried by a lever H, to which is connected a rod I, which may be used to throw the wheels in gear. The shaft B is journaled in a frame J, which has a ring K, which is journaled in the ring L, balls M being used in the bearing and the ring L being provided with a suitable frame whereby it may be connected with the vehicle it is desired to propel. When the wheel $s$, Fig. 5, connects the wheels $e$ and $x$, it revolves a shaft $n'$, carrying a pinion $n$, which starts the main wheel. If the wheels $x, s, e$, and $r$ are thrown in gear on the opposite side of the wheel, it will reverse the same.

The motive power may be electric, compressed-air, gasolene, or other desired power.

Having thus described my invention, what I claim, and desire to secure by Letters Patent, is—

1. In a traction-wheel, the combination with the opposite hubs of the main wheel, of the shaft extending through and between the said hubs the fly-wheel on said shaft between the wheel-hubs, gearing between the said shaft and the main wheel, and means for imparting motion to said shaft substantially as set forth.

2. A traction-wheel comprising the rim, the hub having gear-wheels or rings, the curved spring-spokes between the hub and rim, the framing supporting the wheel, and drive-gearing arranged to mesh with the gear-wheels or rings of the hub substantially as described.

3. A traction-wheel, consisting of the opposite ring-sections, the opposite hub-sections, the curved spring-spokes connecting the rim and hub sections the shaft extending through and between the hub-sections, the fly-wheel on the shaft between the hub-sections and means for turning the shaft substantially as set forth.

4. A traction-wheel comprising the shaft, the opposite hubs thereon, the rim made in sections side by side and the curved spring-spokes connecting the hubs and their respective rim-sections substantially as set forth.

JEREMIAH J. GILLINGER.

Witnesses:
 J. H. STRUCK,
 J. D. YOUNG.